United States Patent
Gilbert et al.

(10) Patent No.: US 9,112,924 B2
(45) Date of Patent: *Aug. 18, 2015

(54) METHODS AND APPARATUS FOR REMOTE DATA TRANSFER

(71) Applicant: Presence IT, Inc., Scottsdale, AZ (US)

(72) Inventors: Patrick L. Gilbert, Scottsdale, AZ (US); Francois Vigneault, Phoenix, AZ (US)

(73) Assignee: Presence IT, Inc., Scottsdale, AZ (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/625,213

(22) Filed: Sep. 24, 2012

(65) Prior Publication Data

US 2013/0018985 A1    Jan. 17, 2013

Related U.S. Application Data

(63) Continuation of application No. 11/244,433, filed on Oct. 4, 2005, now Pat. No. 8,275,367.

(60) Provisional application No. 60/638,905, filed on Dec. 23, 2004.

(51) Int. Cl.
| | |
|---|---|
| *H04L 29/08* | (2006.01) |
| *H04L 12/26* | (2006.01) |
| *H04L 29/06* | (2006.01) |
| *H04W 4/00* | (2009.01) |
| *H04L 12/58* | (2006.01) |

(52) U.S. Cl.
CPC ........ *H04L 67/303* (2013.01); *H04L 29/06326* (2013.01); *H04L 43/0811* (2013.01); *H04W 4/001* (2013.01); *H04L 51/066* (2013.01)

(58) Field of Classification Search
CPC ..... H04W 24/00; H04W 84/12; H04W 80/04; H04W 88/06; H04W 74/08; H04L 43/50; H04L 43/0852; H04L 43/08; H04B 17/003
USPC .......................................... 370/252, 328, 338
See application file for complete search history.

(56) References Cited

U.S. PATENT DOCUMENTS

| | | | | |
|---|---|---|---|---|
| 6,628,934 | B2 * | 9/2003 | Rosenberg et al. | 455/411 |
| 6,647,260 | B2 * | 11/2003 | Dusse et al. | 455/419 |
| 8,565,748 | B2 * | 10/2013 | Knowles | 455/419 |
| 2003/0027581 | A1 * | 2/2003 | Jokinen et al. | 455/456 |
| 2003/0065738 | A1 * | 4/2003 | Yang et al. | 709/215 |
| 2004/0054816 | A1 * | 3/2004 | Carapelli | 710/1 |
| 2004/0082346 | A1 * | 4/2004 | Skytt et al. | 455/456.3 |
| 2004/0242197 | A1 * | 12/2004 | Fontaine | 455/411 |
| 2004/0242209 | A1 * | 12/2004 | Kruis et al. | 455/414.1 |
| 2010/0250725 | A1 * | 9/2010 | Meenan et al. | 709/223 |

* cited by examiner

*Primary Examiner* — Warner Wong
(74) *Attorney, Agent, or Firm* — The Noblitt Group, PLLC

(57) ABSTRACT

Methods and apparatus for communication and data transfer according to various aspects of the present invention include a communication system configured to transfer data to and from a mobile customer device. The communication system may receive customer data for a customer, such as a communication carrier for and a type of remote device. The communication system may include a storage system to store communication information associated with a plurality of wireless carriers and/or device types, such as the wireless carrier and the remote device identified for the user. The communication system may further include a host configured to access the storage system and communicate with the remote device according to the communication information associated with the wireless carrier and/or the remote device.

11 Claims, 4 Drawing Sheets

METHODS AND APPARATUS FOR REMOTE DATA TRANSFER

CROSS-REFERENCES TO RELATED APPLICATIONS

This application is a continuation of U.S. patent application Ser. No. 11/244,433, filed on Oct. 4, 2005, which claims the benefit of U.S. Provisional Patent Application No. 60/638,905, filed Dec. 23, 2004, and incorporates the disclosure of each application in its entirety by reference. To the extent that the present disclosure conflicts with any referenced application, however, the present disclosure is to be given priority.

FIELD OF THE INVENTION

The invention relates to methods and apparatus for remote data transfer.

BACKGROUND OF THE INVENTION

Handheld devices are becoming more powerful and growing in popularity. One class of such devices includes mobile phones known as "smartphones." In addition to mobile phone service, these devices typically provide personal digital assistant (PDA) services such as calendar and contact management, as well as other features such as integrated digital cameras, internet access, e-mail access, and the ability to read documents in a variety of formats such as Portable Document Format (PDF) and Microsoft Word. Individuals and small businesses, however, are often limited in the range of possible smartphone features they can employ due to extensive infrastructure requirements necessary to deliver those features. This infrastructure is often expensive and burdensome for smaller groups of smartphone users to implement.

SUMMARY OF THE INVENTION

Methods and apparatus for communication and data transfer according to various aspects of the present invention include a communication system configured to transfer data to and from a mobile customer device. The communication system may receive customer data for a customer, such as a communication carrier and a type of remote device. The communication system may include a storage system to store communication information associated, with a plurality of communication carriers and/or device types, including the communication carrier and/or the device type identified for the user. The communication system may access the storage system and communicate with the remote device according to the communication information associated with the communication carrier and/or the remote device.

BRIEF DESCRIPTION OF THE DRAWING

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various machines, processors, communication protocols, communication carriers, mobile devices, smartphones, e-mail programs, application servers, and communication media which may carry out a variety of functions under the control of one or more microprocessors or other control devices. In addition, the present invention may be practiced in conjunction with any number of other processes, and the systems described are merely exemplary applications for the invention. Further, the present invention may employ any number of conventional techniques for data control, data storage, data processing, data transfer, component control and configuration, and the like.

Figure 1:
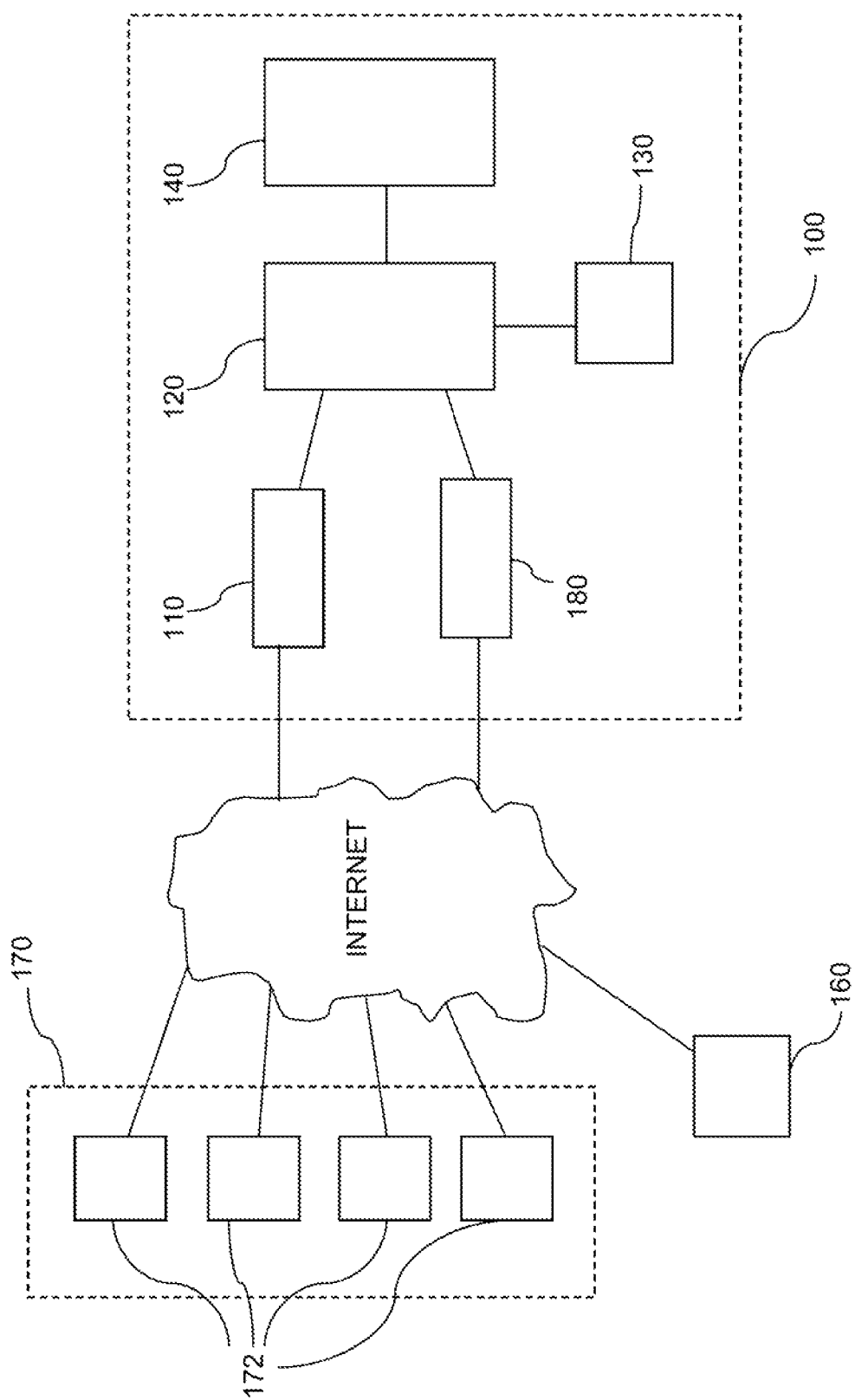
FIG. 1 is a block diagram of a communication system according to various aspects of the present invention.

Referring to FIG. 1, a communication system 100 communicates data between the communication system 100 and one or more remote customer devices 170. The communication system 100 according to various aspects of the present invention comprises an application system 140, a host 120, and a storage system 130. The application system 140 generates or receives information to be communicated to or received from the customer devices 170. The host 120 manages the setup and control of customer accounts and the transfer of information to and from the application system 140, and the storage system 130 stores and provides information that may be used to facilitate communication. The customer accounts and the storage system 130 provide data for transferring information, such as e-mail and other electronic communications, between the application system 140 and customer devices 170.

The remote customer devices 170 may comprise any devices for receiving and transmitting communications. For example, the remote customer devices 170 may include multiple mobile, handheld communication systems 172, such as cellular telephones, used by multiple different users having different contact information, such as telephone numbers and e-mail addresses. Each mobile customer device 172 may comprise a wireless telephone configured to send and/or receive data, such as a smartphone, a personal digital assistant, and the like, in one embodiment, the mobile customer devices 172 comprise conventional smartphones using Microsoft Windows Mobile, Microsoft Outlook, and/or other appropriate programs for voice, text, and/or data communication, wireless access to contacts, e-mail, calendar and other information, browsing corporate and Internet information and services, or other appropriate functions and services. The customer devices 170 may also include less mobile or substantially immobile systems, such as laptop or desktop computers and/or other communication devices.

The communication system 100 may utilize a customer interface 110 to communicate with the user, for example to initially establish service and manage the user's account. The customer interface 110 facilitates entry of customer information to facilitate communication between the application system 140 and the customer devices 170. The customer interface 110 may comprise any suitable interface or system for transferring information to the host 120, and may be configured to communicate data in any format.

For example, the customer interface 110 may comprise an information collection interface, such as a graphical interface, presented to the user via a customer device 170, such as a desktop computer system or a mobile customer device 172. In one embodiment, the customer interface 110 may comprise a web site having one or more web pages on the World Wide Web, generated by a web server or the host 120 and transmitted via the Internet to the customer device 170. The web site may be implemented in any suitable manner to prompt the user for or otherwise receive information, for example via web objects such as pull-down menus and text boxes in response to prompts from the website, for setting up a user account to facilitate data transfer between the application system 140 and the customer devices 170.

In the present embodiment, the website collects information from a user to set up a customer account. The information may comprise any appropriate information, such as the user's name; a user name and password; the user's e-mail address; billing information such as a credit card type, number, and expiration date; an enterprise affiliate code if the user is associated with a particular enterprise for billing and communication purposes; and a service plan. The website also suitably collects information relating to the customer device, such as the telephone number of the smartphone; the manufacturer and model of the smartphone; and the name of the communication carrier for the smartphone.

The host 120 receives the information from the customer interface 110 and manages the user's account for communication between the application system 140 and one or more customer devices 170. The host 120 may be implemented in any suitable manner, such as using a software application running on a computer system. The host 120 may be configured to communicate data with any number of suitable systems and devices in any suitable manner. For example, the host may be configured to communicate with the customer devices 170 the storage system 130, and the application system 140 over at appropriate communication medium, such as direct connection, the Internet, wireless signals, and/or a local area network (LAN). The host 120 may be configured to process data in any suitable manner. In addition, the data sent, received, created, and processed by the host 120 may be of any suitable format such as ASCII text, binary, compressed files, and the like.

In the present exemplary embodiment, the host 120 processes user information received from the customer interface 110, creates customer accounts on the application system 140, facilitates configuration of the mobile customer device, and manages the transfer of data between the application system 140, the customer devices 170, and other systems. For example, the host 120 may receive the data from the customer interface 110 and initially store the information locally. The host 120 may also validate information received from the customer interface 110, for example by processing and responding to any input data in any suitable manner, such as to evaluate data entries and re-prompt the user to enter data that is considered invalid for any reason, such as when a user enters a username already present in the system or billing information that cannot be adequately verified.

The host 120 may be configured to generate a user account based, at least in part, the information received via the customer interface 110. The user account may include any suitable information, such as an account identifier, the user's name and password, billing information, and contact information. The host 120 may set up any other aspects of the account in any suitable manner using any appropriate information or structure. For example, the host 120 may establish account information to facilitate billing the user's credit card, providing service notices to the user, providing access to account information by the user, allowing changes to be made to the account by the user, and the like.

The host 120 may provide the information to the application system 140 for use by the application system 140. The information may be provided in any suitable manner using any appropriate information or structure. For example, the host 120 may structure a set of information for use by the application system 140 and store the set of information in a location accessible by the application system 140. The host 120 may then send a notification to the application system 140 or set a flag for polling by the application system 140, indicating that a new account is ready to be established or that information for an existing account is to be changed.

The information provided to the application system 140 may comprise any appropriate information. For example, the host 120 may provide information for setting up a user account on the application system 140 to run one or more applications for the user. In the present embodiment, the host 120 provides various information received via the customer interface 110, such as the user name, password, and the user's e-mail address, to the application system 140. The host 120 may also supply any other information that may be relevant to the application system's operations. For example, the host 120 may access the storage system 130 to retrieve communication protocols for transferring data via the communication carrier to the type of mobile customer device 172 identified by the user.

The host 120 may also facilitate configuration of the customer device(s) 170 to be communicating with the application system 140, such as the user's smartphone, so that the customer device 170 may communicate with the application system 140. The configuration may be performed automatically or manually. For example, the host 120 may access the storage system 130 to retrieve communication and configuration information associated with the relevant wireless carrier and/or the relevant customer device 170. The information for automatically configuring the customer device 170, including the information retrieved from the storage system 110, may be organized into an initialization code, which may then be forwarded to the customer device 170, for example using the communication carrier information retrieved from the storage information 130. Upon receiving the initialization code, the customer device 170 may use the information to automatically change its operational configuration to communicate with the communication system 100.

The host 120 may also provide information for manually configuring the customer device to communicate with the application system 140. For example, if the host 120 cannot facilitate automatic configuration of the customer device 170, the host 120 may notify the user, for example via the customer interface 110, and provide instructions for manually configuring the customer device 170. In one embodiment, the host 120 selects manual configuration instructions according to any suitable criteria, such as the manufacturer and model of the customer device 170 and the communication carrier identified by the user. The host 120 may then provide the selected manual configuration instructions to the user, for example via e-mail or the customer interface 110. The user may then follow the instructions to manually configure the customer device 170 for communication with the application system 140.

The storage system 130 stores information to be used by the host 120, the application system 140, and/or any other appropriate systems. The storage system 130 may comprise one or more physical storage units, such as hard drive arrays, memory, optical media, and the like, and may utilize one or more suitable software and/or firmware systems for storing data. For example, the storage system 130 may include a Structured Query Language (SQL) database or other suitable database operating on a computer system that communicates with one or more hard drives. The storage system 130 may communicate with any number of other systems and devices, which may be internal or external to the communication system 100. The storage system 130 may also facilitate storage of any relevant information. In the present embodiment, the storage system 130 is accessed by the host 120 and/or the application system 140. For example, the storage system 130 may be used by the host 120 and the application system 140 to store account information for various users, communication protocols for communication carriers, and communication information for various types of customer devices 170. The storage system 130 may be interfaced with in any suitable manner, such as over a Local-Area Network (LAN), through the Internet, or over a wireless connection.

The storage system 130 may store any type of data used by the communication system 100. In the present embodiment, the storage system 130 stores information relating to communication procedures and protocols for multiple wireless devices and/or multiple communication carriers. For example, the storage system 130 may include information on how data communications are structured by a particular wireless carrier for transmission to the wireless carrier's users' devices. The storage system 130 may also include information regarding how various different models of mobile customer devices 172 process incoming and/or outgoing signals to facilitate communication of data and/or other signals. In addition, the storage system 130 may store configuration information for configuring different types of customer devices 170 for communication via various communication carriers. The storage system 130 may provide information for communicating with any number of mobile customer devices 172 via any number of wireless carriers. In addition, the storage system 130 may be configured to be regularly updated, such as via a third party source of communication standards and protocol information.

The application system 140 generates, transfers, and/or receives data to be transmitted to and/or received from the mobile customer devices 172. The data may comprise any suitable data, such as application data files, e-mail, calendar information, contacts information, and the like. In the present embodiment, the application system 140 communicates data that is processed and stored by Microsoft Outlook and/or related or similar applications.

The application system 140 may comprise any suitable system for storing, processing, and/or communicating data with any other suitable system and device, such as the customer devices 170, including the mobile customer devices 172. The application system 140 may operate in conjunction with any appropriate software systems and applications, such as conventional groupware, collaborative software, knowledge management tools, information sharing tools, and/or electronic communication tools. The application system 140 may offer any number of functions and features to facilitate data transfer and usefulness within an organization and/or by individuals, such as backup systems, hosting, information sharing, and groupware capability.

For example, the application system 140 may comprise an application server running one or more applications for access by multiple users and/or remote devices 170. In one exemplary embodiment, the application system 140 runs a Microsoft Exchange Server or other appropriate groupware system or shared resource, such as IBM/Lotus Notes, an Internet server, or a media server. The Microsoft Exchange Server may be implemented in any suitable manner, such as through a Microsoft Exchange application running on a server computer connected to a local or global area network. The application system 140 may be implemented, however, using any appropriate systems that provide access to data, such as e-mail, calendar, and contact data, for different users and/or customer devices 170.

The application system 140 may be configured to facilitate access to information associated with different accounts by authorized users. In the present embodiment, each user is associated with a Microsoft Exchange account on the Microsoft Exchange server and/or one or more e-mail accounts. The Microsoft Exchange account may be established utilizing any suitable information, such as information provided in the user registration process. The Microsoft Exchange account may also include information regarding one or more other accounts, which may be on the Microsoft Exchange server 150 or on a server outside the communication system 100.

Similarly, the e-mail account may be associated with a new account and/or one or more pre-existing e-mail accounts on an external server 160 or an internal server, such as conventional e-mail servers. In one embodiment, the host 120 is configured to retrieve e-mail from web-based e-mail accounts. The user may provide a password and an e-mail address or username for accessing the account. The host 120 is suitably configured to automatically log onto the account using the username and password and forward or otherwise transfer e-mail or other data in the account to the application system 140.

In the present embodiment, the application system 140 facilitates access to information stored in the storage system 130 or elsewhere for different users. The data may comprise any suitable information, such as e-mails, calendar data, contacts data, documents, spreadsheet information, and the like. In the present embodiment, the information comprises data used by applications that may operate on the customer devices 170. In response to a request from a customer device 170, the application system 140 may access the storage system 130 to retrieve requested information. The retrieved information may then be transmitted to the customer device 170 that requested the information. Likewise, information received from the customer device 170 may be transmitted to the application system 140 and stored in the storage system 130.

The communication system 100 may also include a gateway 180 to coordinate the transfer of information between the application system 140 and the customer devices 170. The gateway 180 may comprise any suitable system to synchronize information in the storage system 130 for a particular account with the information stored in the customer devices 170 or otherwise provide access to information via the storage system 130 and/or the application system 140. The synchronization process may be performed in any suitable manner, such as via intermittent, regular updates to and from any customer devices 170 connected to the application system 140 and/or in response to creation, deletion, or modification of a data object by a customer device 170.

In the present embodiment, the gateway 180 operates in conjunction with Microsoft ActiveSync, the SyncML open standard, an IMAP-based system, or the like. The gateway 180 and/or the application system 140 may also be configured to "push" e-mail or other data to the customer device 170 before a regular, periodic synchronization. The gateway 180 suitably provides updates and checks for new information when a customer device 170 initially contacts the communication system 100. While they remain in communication, updates are synchronized between the communication system 100 and the customer device 170.

The communication system 100 may also include any suitable method, system, and device to protect data in any manner. According to various aspects of the present invention, for example, the communication system 100 includes physical security, such as locating the system in a fireproof guarded facility. In addition, the communication system 100 suitably incorporates various protections against hacking and other malicious acts, including virus-scanning software, hashed and encrypted passwords, encryption of data, firewalls, Virtual Private Networking (VPN), spam filtering, and employee data privacy policies to prevent data theft. Furthermore, the present embodiment of the communication system 100 includes processes for backing up data to avoid inadvertent data deletion/loss.

While the features of the present exemplary embodiment are shown as distinct functional members, systems may be integrated or separated in any suitable manner, and do not necessarily correspond to actual physical systems upon which they are implemented. The connections between these systems are also merely illustrative, and may be implemented in any suitable manner. For example, the application system 140 may be implemented using multiple computer systems and may communicate directly with the customer interface 110. Additionally, the functionality attributed to any particular system or subsystem may be alternatively or concurrently performed by any other element of the communication system 100.

Figure 2:
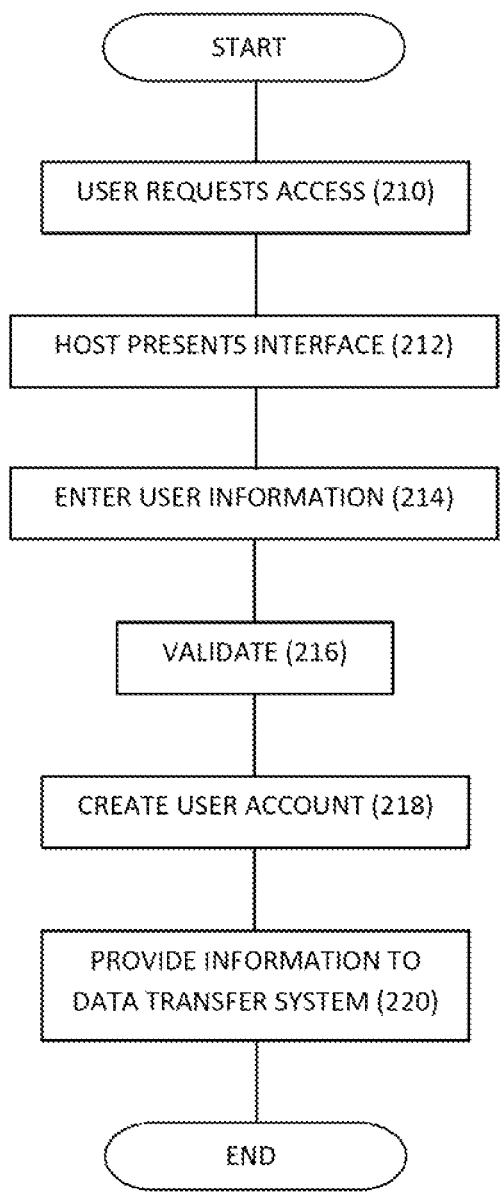
FIG. 2 is a flow diagram of a process for user registration and account setup.

In operation, the user initially registers with the communication system 100. The registration process may be performed in any suitable manner, such as by contacting the communication system 100 and providing registration information. Referring to FIG. 2, in the present embodiment, the user contacts the communication system 100 via a customer device 170, such as a personal computer or a cellular telephone connected to the Internet (210). The host 120 presents the customer interface 110 to the user to prompt the user to enter any desired customer information via a website (212). A user engaging the customer interface 110 through the website enters information through web objects, such as pull-down menus and text boxes, in response to prompts from the website (214). Similarly, a user engaging the customer interface 110 through a mobile customer device 172 enters information through a suitable user interface on a mobile device, such as using the mobile device's keypad to enter data in text boxes. In the present embodiment, the user selects a service plan and provides a manufacturer and model for a relevant mobile customer device 172, a communications carrier, the user's name, a telephone number for the mobile customer device, the user's e-mail address, a password for account access, and an enterprise affiliate code if the user is associated with a particular enterprise for billing; and communication purposes. The host 120 may validate this information, for example, by sending an e-mail to the identified address, calling the telephone number, checking relevant databases, providing the entered information to the user for review, and/or any other appropriate measures (216).

The host 120 initiates creation of the user account. The host 120 receives the information from the user and retrieves any other information, such as from the storage system 130 or another source, that may be used to establish the user's account. In the present embodiment, the host 120 creates a user account on the host based on the received information (218). The host 120 may also provide information to the application system 140 to establish an account for any relevant applications, such as a Microsoft Exchange account (220). In the present embodiment, the host 120 stores any appropriate information, such as account information, telephone number, and e-mail address, at a location accessible by the application system 140 and sets a flag, indicating that information is available for processing by the application system 140.

Figure 3:
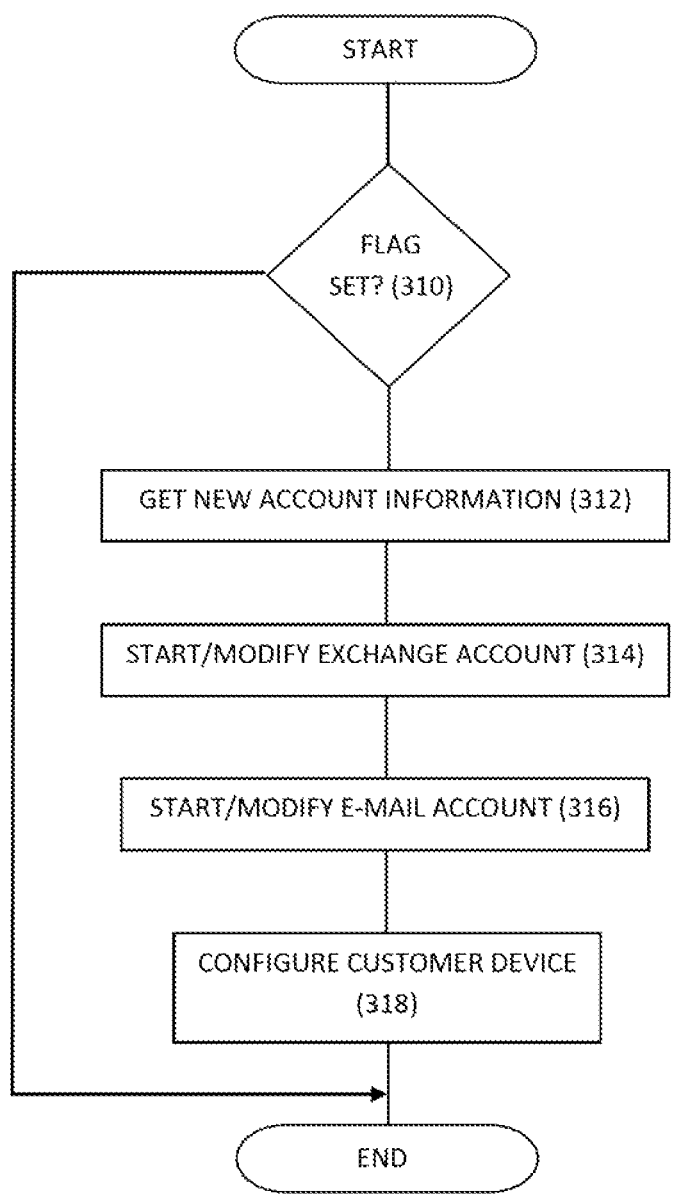
FIG. 3 is a flow diagram of a process for setting up an application account.

Referring to FIG. 3, the application system 140 periodically checks the flag (310) and, when the flag is set, accesses the area where the new account information is stored (312). The application system 140 then sets up one or more accounts for transferring data to and from the customer device 170. For example, the application system 140 may establish a Microsoft Exchange account on the Microsoft Exchange server (314) and an e-mail account (316) for the user based on the information received, from the host 120. The host 120 may create a Microsoft Exchange account utilizing any suitable information provided in the user registration process, such as any or all of the provided user information and/or the username and password provided by the user. The Microsoft Exchange account setup process may also involve the user identifying or creating one or more pre-existing accounts, which may be on the exchange server or on an e-mail server 160 outside the communication system 100. The application system 140 may also download and/or import any initial data to populate the new account, such as existing calendar data, e-mails, contacts information, and the like.

The host 120 may also configure the customer device 170 for communication with the communication system 100 (318). For example, the host 120 may access the storage system 130 to obtain information regarding the appropriate operating parameters and configuration for the particular mobile customer device 172 for communicating with the communication system 100. The host 120 may then prepare and send an appropriate initialization code for configuring the mobile customer device 172. The mobile customer device 172 automatically processes the initialization code to set its operating parameters for communication with the application system 140.

Alternatively, the host 120 may provide to the user, such as via the customer interface 110, instructions for manually configuring the mobile customer device 172 for communication with the communication system 100 according to the type of mobile customer device 172 and/or the relevant communication carrier. In the present embodiment, the web site displays a step-by-step visual guide to illustrate how to change the settings of or otherwise program or reconfigure the mobile device. The customer interface 110 may incorporate data entered by the user to display photographs of the mobile device specified by the user in the visual guide.

Figure 4:
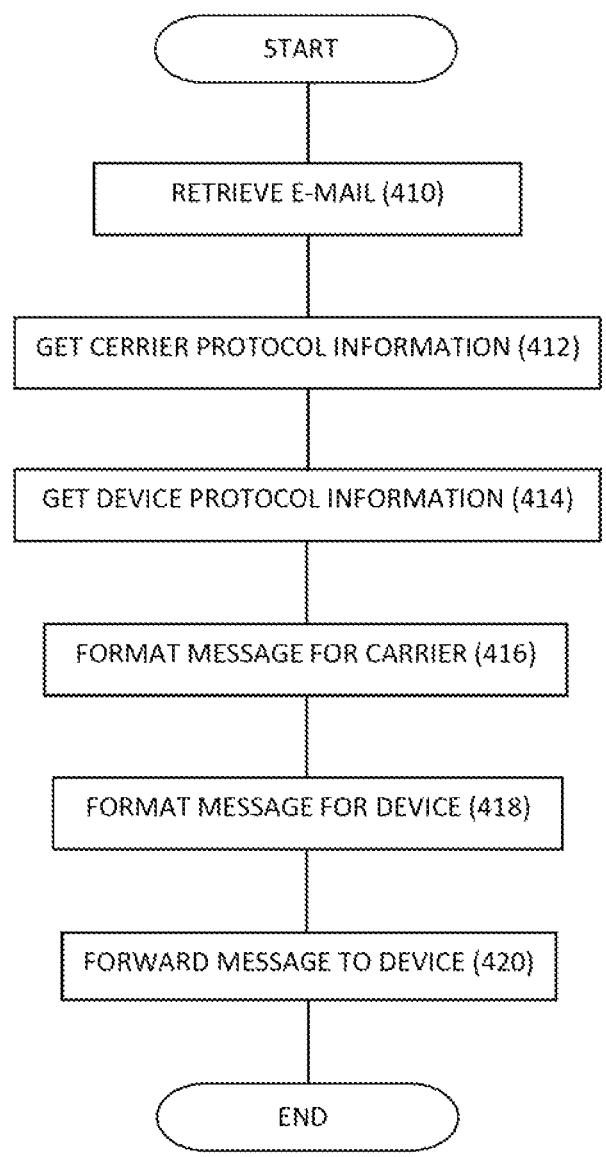
FIG. 4 is a flow diagram of a process for converting and transmitting a communication.

When the mobile customer device 172 has been configured, the user may send and receive data via the mobile customer device. For example, referring to FIG. 4, to receive data from an external source, such as an external e-mail server 160, the application system 140 may operate as an e-mail server, such as by periodically checking for incoming e-mail and storing the e-mail in the storage system 130 (410). Alternatively, the communication system 100 may generate data, retrieve data from a non-e-mail source, or transmit data received by the application server 140.

If the mobile customer device 172 is accessible, the application system 140 may forward or otherwise make available the relevant data, such as the incoming e-mail, to the mobile customer device 172. To forward the data to the mobile customer device 172, the host 120 may receive the data from the application system 140 and format the data for communication, for example to accommodate particular communication protocols of the communication carrier and/or the mobile customer device 172. In one embodiment, the host 120 may access the storage system 130 for communication information, such as to retrieve the user's communication carrier information from the storage system 130 and determine the appropriate communication protocols for communicating data via the particular communication carrier (412). The host 120 may format the data according to the communication protocols employed by the user's communication carrier (416). In addition, by accessing the information in the storage system relating to the user's mobile customer device 170 (414), the host 120 may format the e-mail according to the manufacturer and model information for the mobile customer device 172 (418) so that the e-mail may be forwarded to the user (420) and received and properly processed by the mobile customer device 172.

Conversely, when the user sends an e-mail or other data communication from the mobile customer device 172, the e-mail is received by the host 120, which converts the message to a form that may be used by the application system 140 or other system. For example, the host 120 may access the storage system 130 to identify relevant communication information for the communicated data, such as communication protocols associated with the communication carrier and/or the mobile customer device 172, and convert the communication data to a compatible format, such as a conventional e-mail format. The e-mail may then be forwarded as a conventional e-mail, such as by the application system 140.

The user may also access any other information via the host 120 and/or the application system 140. For example, when the mobile customer device 170 and the communication system 100 are in communication, data for any relevant applications may be synchronized so that each system has an identical data set. When communication is broken, such as when the mobile customer device 170 is deactivated or out of range, then the data may be synchronized again upon re-establishing contact, to example by the gateway 180. Thus, data other than e-mail data, such as calendar information, contacts data, word processing files, spreadsheets, and the like may be accessible to the user via the mobile customer device 172. As described above, information transferred between the communication system 100 and the mobile customer device 172 may be formatted and converted according to any suitable criteria, such as the requirements of the communications carrier and/or the mobile, customer device 172, to ensure that the information may be properly transmitted and received.

The particular implementations shown and described are illustrative of the invention and its best mode and are not intended to otherwise limit the scope of the present invention in any way. Indeed, for the sake of brevity, conventional signal processing, data transmission, and other functional aspects of the systems may not be described in detail. Furthermore, the connecting lines shown in the various figures are intended to represent exemplary functional relationships and/or physical couplings between the various elements. Man alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention, as expressed in the following claims.

The invention claimed is:

1. A method for remote communication and data transfer between a communication system and a remote device comprising:
    receiving customer data from the remote device with a customer interface communicatively linked to a host of the communication system, wherein the customer data comprises a remote device type;
    automatically creating a data transfer account with an application system communicatively linked to the host, wherein the data transfer account is based on the customer data;
    querying the application system to select a communication layer protocol based on the remote device type, wherein the communication layer protocol is used to transfer information from the host to the remote device;
    automatically configuring the remote device with the selected communication layer protocol to facilitate communication with the host;
    retrieving requested information from an external data source with the application system;
    formatting the retrieved requested information according to the selected communication layer protocol; and
    transferring the formatted requested information to the remote device.

2. The method of claim 1, further comprising storing the retrieved requested information in a storage system linked to the application system prior to transfer to the remote device.

3. The method of claim 1, wherein receiving customer data comprises presenting an interface to a user over the internet.

4. The method of claim 1, wherein the customer data further comprises a customer name, customer billing data, and contact data for the remote device.

5. The method of claim 1, wherein configuring the remote device comprises:
    creating an initialization message including configuration data based on the remote device type;
    providing the initialization message to the remote device; and
    automatically configuring the remote device according to the configuration data to facilitate communication between the remote device and the host.

6. The method of claim 5, wherein providing the initialization message to the remote device comprises retrieving a communication carrier from the data transfer account and communicating the initialization message to the remote device through the communication carrier.

7. A system for remote communication and data transfer to a remote device from a communication system, comprising:
    a customer interface linked to the communication system, wherein the customer interface is:
        responsive to a request to establish service initiated by the remote device over the internet; and
        configured to receive customer data for a customer from the remote device, including a remote device type for the remote device; and
    an application system communicatively linked to the customer interface and configured to:
        automatically create a data transfer account based on the customer data;
        query a storage system for storing communication information to select a communication layer protocol based on the remote device type, wherein the communication layer protocol is used to transfer information to the remote device;

automatically configure the remote device with the selected communication layer protocol to facilitate communication with the communication system;

retrieve requested information from an external data source;

format the retrieved requested information according to the selected communication layer protocol; and transfer the formatted requested information to the remote device.

8. A system for remote communication according to claim 7, wherein the storage system is linked to the application system and configured to store the retrieved requested information prior to transfer to the remote device.

9. A system for remote communication according to claim 7, wherein the application system is further configured to:

create an initialization message including configuration data based on the remote device type;

provide the initialization message to the remote device; and automatically configure the remote device according to the configuration data to facilitate communication between the remote device and the communication system.

10. A system for remote communication according to claim 9, wherein the application system is further configured to:

retrieve a communication carrier associated with the remote device from the data transfer account; and communicate the initialization message to the remote device through the communication carrier.

11. A system for remote communication according to claim 7, wherein the customer data comprises a customer name, customer billing data, and contact data for the remote device.

* * * * *